US006144541A

United States Patent [19]

Kato et al.

[11] Patent Number: 6,144,541

[45] Date of Patent: Nov. 7, 2000

[54] CIRCUIT PROTECTOR, RESILIENT HEAT-SENSITIVE PLATE THEREFOR AND ITS MANUFACTURING METHOD

[75] Inventors: Tatsuo Kato, Maebashi; Eiichi Hashimoto, Isesaki, both of Japan

[73] Assignee: Hosiden Corporation, Osaka, Japan

[21] Appl. No.: 09/275,882

[22] Filed: Mar. 25, 1999

[30] Foreign Application Priority Data

Mar. 25, 1998 [JP] Japan ................................. 10-077154

[51] Int. Cl.[7] ...................................................... H02H 5/04

[52] U.S. Cl. .......................... 361/105; 337/333; 337/365

[58] Field of Search ................................ 361/105; 337/3, 337/36, 333–337, 362, 365; 29/622

[56] References Cited

U.S. PATENT DOCUMENTS 5,023,744 6/1991 Hofsass ..................................... 361/26
5,337,036 8/1994 Kuczynski .............................. 337/343
5,615,072 3/1997 Hofsass et al. ........................... 361/24
5,745,022 4/1998 Becher et al. .......................... 337/104
5,894,259 4/1999 Kolberg et al. ......................... 337/333

*Primary Examiner*—Michael J. Sherry
*Attorney, Agent, or Firm*—Pollock, Vande Sande & Amernick, RLLP

[57] ABSTRACT

A heat-sensitive plate is substantially rectangular, has its one end portion fixed to a second terminal plate and has a movable contact mounted on the other end portion. The one side of the heat-sensitive plate facing a fixed contact forms a high expansion coefficient side and the other side a low expansion coefficient side. The heat-sensitive plate has a protrusion protrusively provided on the low expansion coefficient side centrally thereof by press working with a small outer diameter and a large curvature, and an annular press-thinned portion formed by press working concentrically with the protrusion and having an inner diameter appreciably larger than the outer diameter of the protrusion. In the initial state the heat-sensitive plate is held curved in a funnel shape protrusive about the protrusion on the low expansion coefficient side.

15 Claims, 9 Drawing Sheets

CIRCUIT PROTECTOR, RESILIENT HEAT-SENSITIVE PLATE THEREFOR AND ITS MANUFACTURING METHOD

BACKGROUND OF THE INVENTION

The present invention relates to a circuit protector of the type wherein upon flowing of excess current across a pair of terminals, a heat-sensitive plate bends to snap its movable contact disengaged from a fixed contact to thereby cut off the excess current, the heat-sensitive plate for use in the circuit protector and a method of making the heat-sensitive plate. More particularly, the invention pertains to a heat-sensitive plate suitable for miniaturization of the circuit protector.

FIGS. 1A and 1B depict an example of a conventional circuit protector disclosed in Japanese Patent Application Laid-Open Gazette No. 7-27040. The circuit protector of this example has substantially a block-shaped base 12 molded of synthetic resin, and a box-shaped cover 13 which is also a molding of synthetic resin and whose bottom opening is blocked by the base 12. When the cover 13 is mounted on the base 12, lugs 16 formed integrally with the base 12 on one side thereof engage holes 17 made in one side wall of the cover 13 to prevent it from becoming dislodged. On the base 12 there are planted terminal plates 14 and 15 vertically extending therethrough. The terminal plates 14 and 15 are mounted in parallel with each other on the base 12 and spaced apart but side by side in the lengthwise direction thereof.

On one side of the first terminal plate 14 that lies in the cover 13 shown in FIG. 1B, there is mounted a fixed contact 18. The second terminal plate 15 carries a heat-sensitive plate 19 mounted on one side thereof. On the top of the base 12 there is planted near the first terminal plate 14 at the side opposite from the second terminal plate 15 a pin 32 to which a coil spring 28 is fixed at one end. The coil spring 28 has its upper end portion received in a hole 31 made in the lower end face of a reset rod 27, and pushes it up. The reset rod 27 has a thin rectangular insulating plate 33 that extends from its one side surface and across substantially the entire surface area of the second terminal plate 15 on which the fixed contact 18 is mounted.

Even when the reset rod 27 is at its lowermost position, its upper end portion projects upwardly from a guide hole 29 made in the top of the cover 13. The heat-sensitive plate 19 extends across the first terminal plate 14 with its tip or forward end portion projected beyond the far side of the plate 14 to keep a movable contact 24 in touch with the fixed contact 18 at all times.

The heat-sensitive plate 19 is a virtually square temperature-sensitive bimetal sheet, which has a U-shaped slit 22 extending along the inside of its marginal edge to form a tongue-shaped movable piece 23. The movable contact 24 is placed near the free end of the movable piece 23. One side of a frame portion 19F just opposite the free end of the movable piece 23 is press-bent centrally thereof to form a V-shaped bend 25 so that this one side is bent into a shallow V-letter shape as a whole. By this, tensile stress is applied to those regions of the frame portion 19F immediately adjoining the V-shaped bend 25 at both sides thereof, and the angle between the surfaces of the both frame regions adjacent the both edges of the V-shaped 25 is made larger than 180 degrees on the side of a large expansion coefficient side of the bimetal sheet. As a result, the heat-sensitive plate 19 is so bent as to swell toward the movable contact point 24 at room temperature, thereby biasing the free end of the movable piece 23 toward the fixed contact 18. The heat-sensitive plate 19 is fixedly secured to the second terminal plate 15 by means of rivets 21 which are inserted through holes 21H made in the frame portion 19F.

When the heat-sensitive plate 19 is not mounted on the second terminal plate 15, the movable piece 23 is obliquely bent toward the fixed contact 18 side. Accordingly, when the heat-sensitive plate 19 is mounted on the second terminal plate 15, the movable contact 24 is resiliently pressed against the fixed contact 18 by the spring force of the movable piece 23 and the heat-sensitive plate in combination as depicted in FIG. 2B, establishing electric connections between the first and second terminal plates 14 and 15. This is a normal state, wherein the insulating piece 33 is urged upward by the coil spring 28 with its upper edge held in abutting relation to the lower marginal edge of the movable contact 24.

The bimetallic heat-sensitive plate 19 has a higher thermal expansion coefficient on the side facing the fixed contact 18 than on the opposite side. When the heat-sensitive plate 19 generates heat due to excess current flow between the fixed and movable contacts 14 and 24 and its temperature rises accordingly, the heat-sensitive plate 19 tends to bend in a direction in which it is concavely curved on that side facing the fixed contact 18. Hence, when overcoming the deformation stress initially applied thereto, the heat-sensitive plate 19 snaps into a reverse curvature, disengaging the free end of the movable piece 23 from the fixed contact 18 and hence cutting off the current flow between the first and second terminal plates 14 and 15. As a result, the insulating piece 33 disengages from the movable contact 24, and is moved up by the coil spring 28 as shown in FIG. 3A and pushed into between the movable contact 24 and the fixed contact 18 as depicted in FIG. 3B. Then the insulating piece 33, which has a rib 34 extending from its base along one side of the reset rod 27, is positioned with the upper end of the rib 34 abutting against the inner surface of the top of the cover 13. Accordingly, even if the temperature of the heat-sensitive plate 19 drops down to about room temperature after cutting off the current flow and the heat-sensitive plate 19 and the movable piece 23 tend to return to their initial state, the movable contact 24 remains abutting against the insulating piece 33, inhibiting the current flow.

The circuit protector in this state is reset by pressing down the reset rod 27 against the coil spring 28 to push down the insulating piece 33 from between the fixed contact 18 and the movable contact 24, bringing the latter into engagement with the former. By releasing the reset rod 27 in this state, the insulating piece 33 is brought up by the coil spring 28 until its upper edge abut against the lower marginal edge of the movable contact 24, thereafter being held at this position.

The conventional protector described above has the U-shaped slit 22 formed inside the marginal edge of the heat-sensitive plate 19 so as to form the movable piece 23. In order that the heat-sensitive plate 19 may snap into the opposite direction of curvature, depending on which of the thermal expansion stress by the bimetal sheet and the tensile stress applied to the frame portion 19F by the V-shaped bend 25 is larger, it is necessary that the frame portion 19 surrounding the movable piece 23 be relatively wide. This constitutes an obstacle to miniaturization of the heat-sensitive plate 19.

In addition, the direction of extension of the movable piece 23 is at right angles (i.e. horizontal) to the direction of movement of the reset rod 27 (the vertical direction in FIGS. 1A, 2A and 3A). Furthermore, the free end portion of the heat-sensitive plate 19 which supports the movable piece 23 extends from the movable contact 24 in a direction opposite to the fixed end of the heat-sensitive plate 19. To enhance the reliability of the operation of the heat-sensitive plate 19, its free end portion needs to be long. However, this gives rise to a problem that the circuit protector is long in the direction of extension of the heat-sensitive plate 19 (that is, the longer side of the rectangular top of the cover 13) is long. Therefore, it has been impossible to meet a demand for circuit protectors of miniature size which has grew strong with the recent miniaturization of electronic equipment.

FIGS. 4A and 4B show another example of the heat-sensitive plate 19 for use in the conventional circuit protector depicted in FIGS. 1A, 1B, 2A, 2B, 3A and 3B. The illustrated heat-sensitive plate 19 has a protrusion 19a protrusively provided on a low expansion coefficient side 19L of a substantially rectangular bimetal sheet by press working of its central portion. The protrusion 19*a* is a little smaller in diameter than the shorter side of the bimetal sheet as shown in FIG. 4A and spherical in cross-section as shown in FIG. 4B. By forming such a protrusion 19*a*, stress is applied to the surrounding region 19*d* to slightly bend it into a shallow funnel shape in the same direction as that of the protrusion 19*a*. On the high expansion coefficient side 19H of the bimetallic element, there is mounted the movable contact 24 adjacent one of its shorter sides. As the temperature of the heat-sensitive plate 19 increases, the high expansion coefficient side 19H expands and is urged to become convex, applying stress to the surrounding region 19*d*. The instant when this stress overcomes the deformation stress by the formation of the protrusion 19*a*, the surrounding region 19*d* snaps its direction of curvature reversed (but the direction of curvature of the protrusion 19*a* remains unchanged).

To make the heat-sensitive plate 19 of the above construction snap into the opposite direction of curvature, it is necessary to form such a relatively large-diametered protrusion 19*a* as depicted in FIG. 4A. In addition, this conventional heat-sensitive plate 19 has the defect of a wide range of variations in the temperature characteristic of the reversal action.

SUMMARY OF THE INVENTION

A first object of the present invention is to provide a heat-sensitive plate of miniature size.

A second object of the present invention is to provide a miniature circuit protector that uses the above-mentioned heat-sensitive plate.

A third object of the present invention is to provide a method of making the above-mentioned heat-sensitive plate.

According to a first aspect of the present invention, there is provided a resilient heat-sensitive plate formed by a rectangular bimetal sheet the one and the other side of which form a high expansion coefficient side and a low expansion coefficient side, respectively, said heat-sensitive plate comprising:

a protrusion formed by press working substantially at the center of said bimetal sheet, protruding outward from said low expansion coefficient side and having a diameter smaller than the shorter side of said rectangular bimetal sheet, said bimetal sheet being curved, by the formation of said protrusion, into a shallow funnel shape in the same direction as said protrusion all over the surrounding area;

an annular press-thinned portion formed concentrically with said protrusion and having an inner diameter larger than the diameter of said protrusion and an outer diameter smaller than said shorter side; and a movable contact mounted on said high expansion coefficient side outside said annular press-thinned portion but adjacent to said shorter side.

According to a second aspect of the present invention, there is provided a circuit protector for cutting off a current flow between terminals in response to a temperature rise, said protector comprising:

a base formed by a block-shaped insulator having substantially rectangular top and bottom faces;

first and second opposed terminal plates made of metal and planted on said base in such a manner as to vertically extend through its top and bottom faces, the upper portion of said first terminal plate projecting upwardly of the top face of said base being substantially rectangular and said first terminal plate being placed with the longer side of the projecting portion held normal to the top face of said base;

a fixed contact mounted on that side of said first terminal plate facing said second terminal plate and located adjacent the upper edge of said first terminal plate, said second terminal plate being placed with its upper edge held lower than the lower end of said fixed contact;

a substantially rectangular heat-sensitive plate which has a funnel-shaped curved surface held approximately directly opposite said first terminal plate but spaced apart therefrom, has a movable contact mounted on said funnel-like curved surface for making resilient contact with said fixed contact and has its lower end potion fixedly secured to said second terminal plate, said heat-sensitive plate urging said movable contact against said fixed contact when the temperature of said heat-sensitive plate is below a predetermined value but, when said plate temperature is above said predetermined value, disengaging said movable contact from said fixed contact by the reversal of the direction of curvature of said funnel-like curved surface;

spring engaging means placed on the top face of said base in adjacent but spaced relation to said opposed first and second terminal plate at one marginal edge thereof;

a coil spring having its lower end engaged with said spring engaging means and placed in a manner to resiliently extend and contract in a direction approximately normal to the top face of said base;

a reset rod having engaged at its lower end face with the upper end of said coil spring and placed perpendicularly to the top face of said base;

an insulating piece extending from one side of said reset rod into between said first terminal plate and said heat-sensitive plate and having a face substantially parallel to said first terminal plate; and a case composed of side and top panels to define space on top of said base and having housed therein said, first and second terminal plates, said heat-sensitive plate, said coil spring, said reset rod and said insulating piece, the upper end portion of said reset rod being allowed to project out through a guide hole made in said upper panel;.

wherein:

said heat-sensitive plate comprises:

a bimetal sheet the one and the other side of which form a high expansion coefficient side and a low expansion coefficient side, respectively, said movable contact mounted on said high expansion coefficient side in close proximity of the upper end of said bimetal sheet;

a protrusion formed by press working substantially at the center of said bimetal sheet, protruding outward from said low expansion coefficient side and having a diameter smaller than the shorter side of said rectangular bimetal sheet, said bimetal sheet being curved, by the formation of said protrusion, into a shallow funnel shape in the same direction as said protrusion all over the surrounding area; and an annular press-thinned portion formed by press working concentrically with said protrusion and having an inner diameter larger than the diameter of said protrusion and an outer diameter smaller than the shorter side of said bimetal sheet; and wherein: in an initial state in which the temperature of said heat-sensitive plate is lower than said predetermined value, the upper edge of said insulating piece is caused by said coil spring to resiliently abut against the lower edge of said movable contact; and when the temperature of said heat-sensitive plate becomes higher than said predetermined value, said insulating piece enters into between said fixed contact point and said movable contact disengaged by the reversal of the direction of said funnel-like curved surface of said heat-sensitive plate.

According to a third aspect of the present invention, there is provided a method of making a resilient heat-sensitive plate formed by a rectangular bimetal sheet the one and the other side of which form a high expansion coefficient side and a low expansion coefficient side, respectively, said method comprising the steps of:

(a) punching a bimetal sheet by press working into a rectangular sheet measuring L×W, where said L is larger than said W;

(b) mounting said rectangular bimetal sheet with said low expansion coefficient side down on a first die having a first hole of an inner diameter R1 smaller than said W, with the center of said low expansion coefficient side of said bimetal sheet held in alignment with the center of said hole;

(c) placing above said bimetal sheet a first punch with its spherical protrusion held in alignment with said hole of said first die, and punching said bimetal sheet by said first punch and said first die to stamp it to form a protrusion at the center of said bimetal sheet and a funnel-like curved portion around it, said first punch being a columnar member which has an outer diameter R2 somewhat smaller than said W but sufficiently larger than said diameter R1 and which has on its underside said spherical protrusion of a diameter nearly equal to said diameter R1;

(d) mounting said bimetal sheet on a second die which has a second hole of an inner diameter R3 nearly equal to said diameter R2, with the center of said protrusion of said bimetal sheet aligned with the center of said second hole; and (e) placing a columnar, flat-bottomed second punch above said bimetal sheet in alignment with said second hole of said second die, and press-working said bimetal sheet by said second punch and said second die to form a donut-like annular press-thinned portion, said second punch having an outer diameter R4 smaller than said W and larger than said diameters R2 and R3.

DETAILED DESCRIPTION OF THE PREFERRED EMBODIMENTS

Figure 5A:
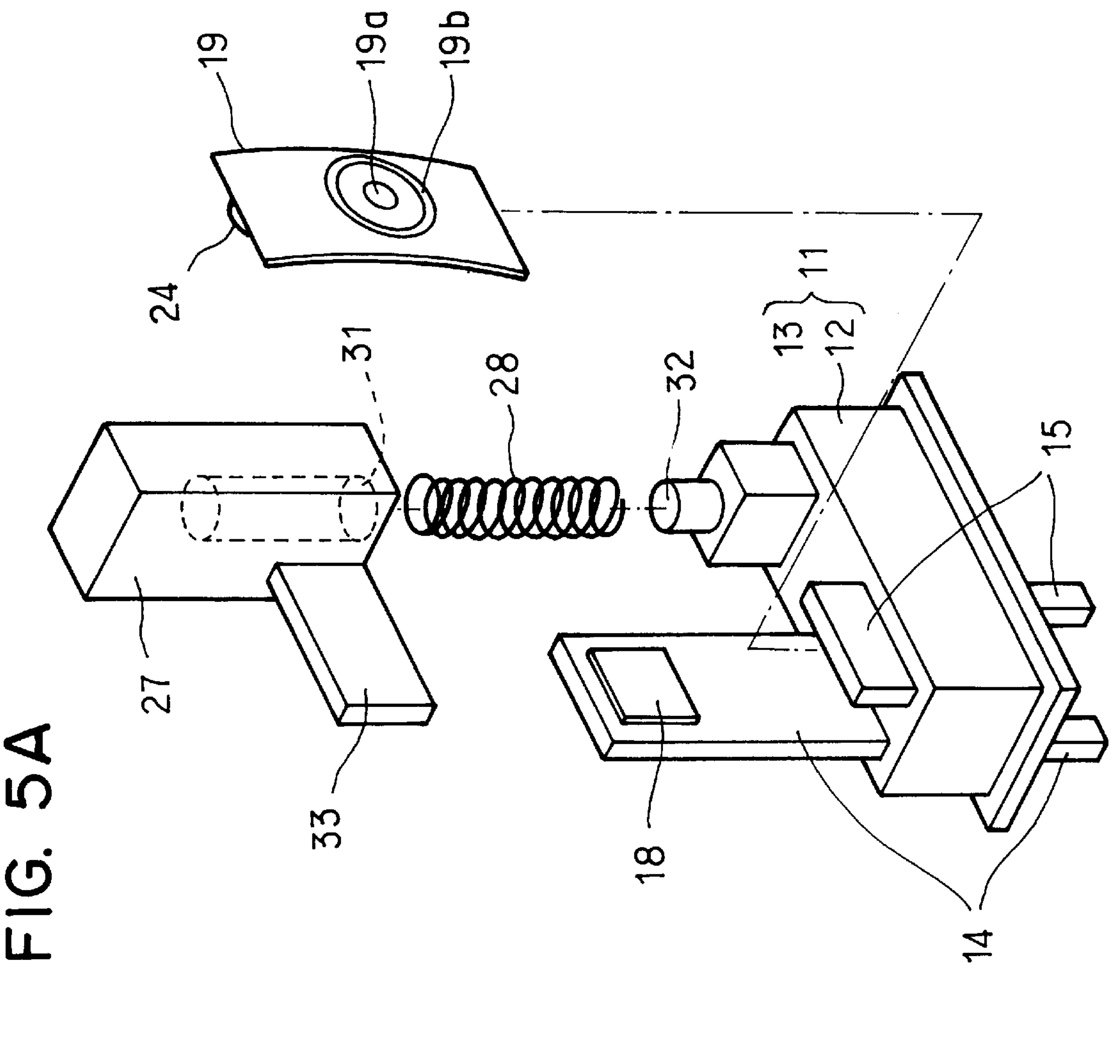
FIG. 5A is a partly-exploded, perspective view of the circuit protector according to the present invention, with its case taken away.
Figure 5B:
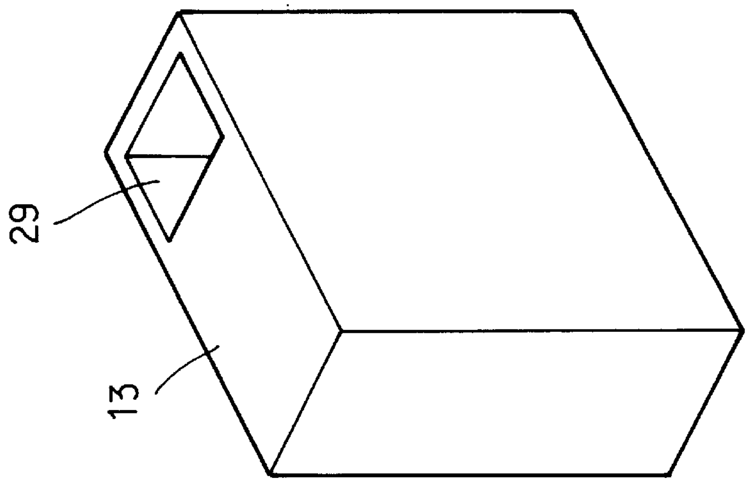
FIG. 5B is a perspective view of the case.

FIG. 5A is an exploded, perspective view of a circuit protector according to an embodiment of the present invention and FIG. 5B a perspective view of its cover. The parts corresponding to those in FIGS. 1A, 1B, 2A, 2B, 3A and 3B are identified by the same reference numerals, and no description will be repeated.

In the circuit protector of the present invention, there are planted on the base 12 the first and second terminal plates 14 and vertically extending therethrough. The first and second terminal plates 14 and 15 are disposed in parallel to the longer sides of the top of the rectangular base 12 and adjacent its one shorter side so that they are spaced apart but in opposed relation to each other. The first and second terminal plates 14 and 15 have about the same width, but the latter needs only to be high enough to fixedly support the heat-sensitive plate 19, and hence it stands lower than the lower edge of the fixed contact 18. On the side of the first terminal plate 14 facing the second terminal plate 15 there is mounted the fixed contact 18 adjacent the upper edge of the plate 14. The fixed contact 18 is formed by press working, or by welding or riveting of a separately prepared contact element. The heat-sensitive plate 19, formed by a curved bimetallic element, is substantially a rectangular plate whose shorter side has about the same width as that of the second terminal plate 15. The heat-sensitive plate 19 is held substantially normal to the top of the base 12 and has its lower end portion fixedly secured as by welding to the second terminal plate 15.

The heat-sensitive plate 19 thus secured to the second terminal 15 is approximately directly opposite the first terminal plate 14, and stands as high as the latter. The heat-sensitive plate 19 carries the movable contact 24 mounted adjacent its upper end for resilient contact with the fixed contact 18 on the first terminal plate 14.

Mounted on the top of the rectangular base 12 adjacent the other shorter side thereof is the pin 32 which receives the lower end of the coil spring 28. The spring 28 has its upper end portion received in the hole 31 made in the square reset rod 27 disposed on the pin 32.

Figure 6B:
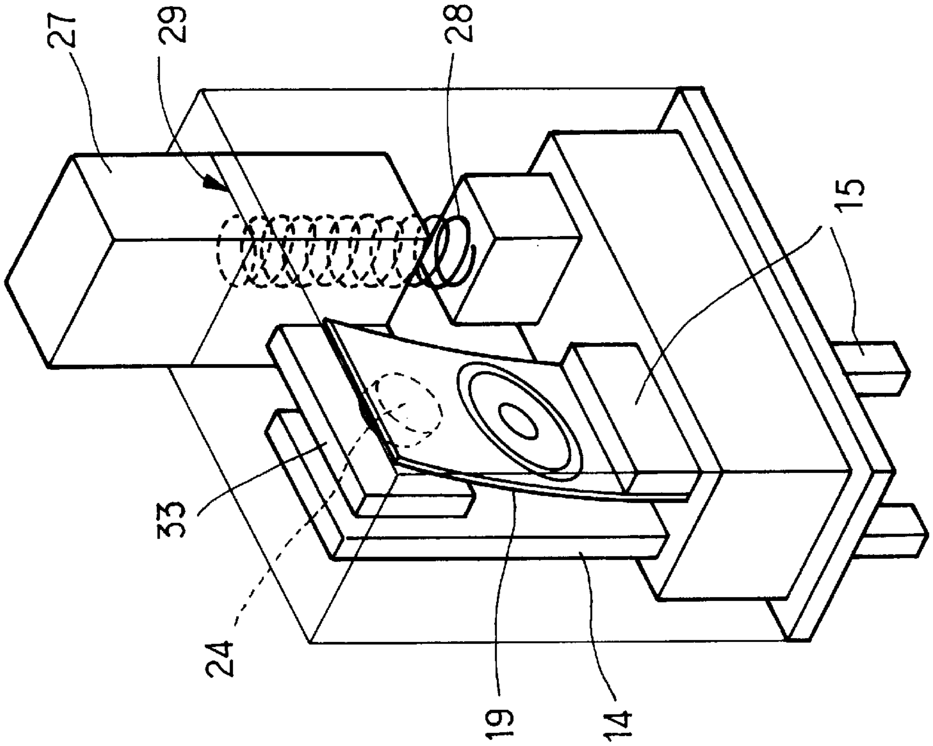
FIG. 6B is a longitudinal sectional view showing the circuit protector of the present invention in its cut-off state.
Figure 6A:
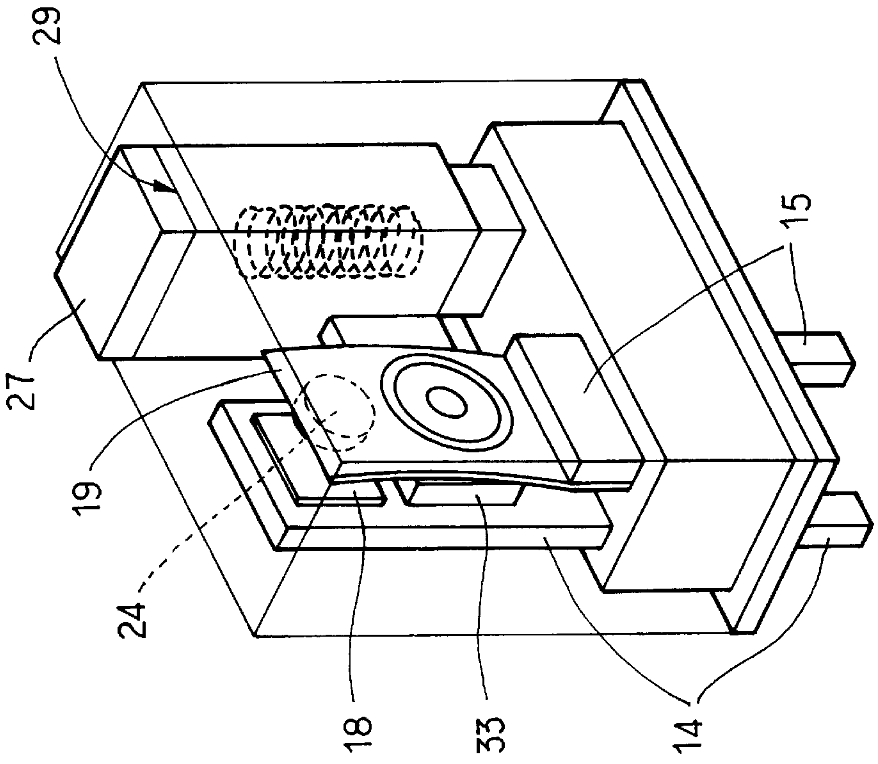
FIG. 6A is a longitudinal sectional view showing the circuit protector of the present invention in its conduction state.

As shown in FIGS. 6A and 6B, the top end portion of the reset rod 27 projects out upwardly of the guide hole 29 bored through the top wall of the cover 13 adjacent one shorter side thereof. The reset rod 27 carries on one side thereof the rectangular insulating piece 33 in parallel to the first terminal plate 14; the insulating piece lies between the heat-sensitive plate 19 and the first terminal plate 14 so that it vertically moves therebetween as the reset rod 27 moves up and down.

During normal energization, as depicted in FIG. 6A, the movable contact 24 is in resilient contact with the fixed contact 18 and the upper edge of the insulating piece 33 is caused by the spring force of the coil spring 28 to resilient abut against the lower edge of the movable contact 24 mounted on the heat-sensitive plate 19. When the temperature of the heat-sensitive plate rises due to excess current, the high expansion coefficient side (facing he first terminal late 14) of the heat-sensitive plate 19 expands more than the low expansion coefficient side (opposite from the terminal plate 14), causing the curvature to snap into the reverse position.

Figure 1B:
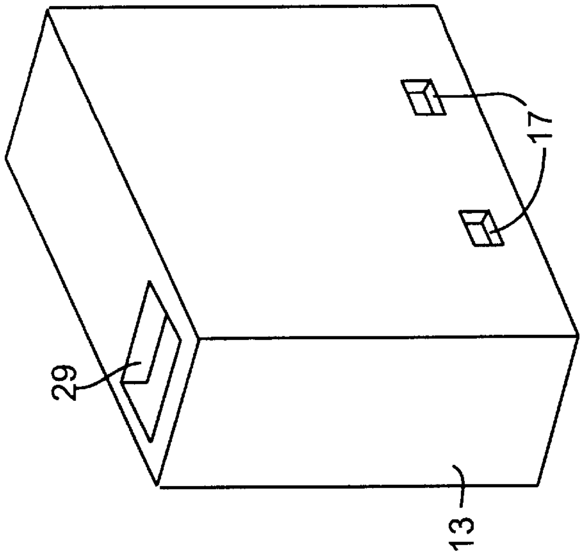
FIG. 1B (PRIOR ART)
FIG. 1B is a perspective view of the case.
Figure 1A:
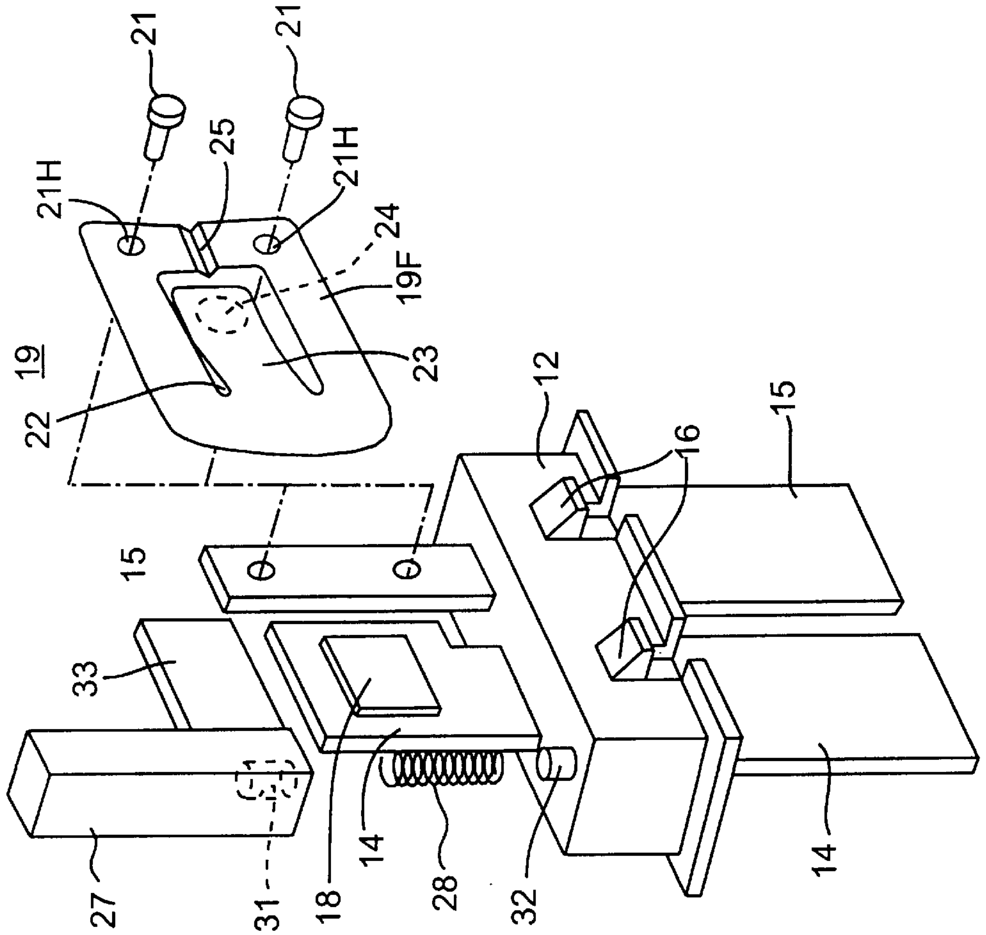
FIG. 1A (PRIOR ART)
FIG. 1A is a partly-exploded, perspective view of a conventional circuit protector, with its case taken away.
Figure 2A:
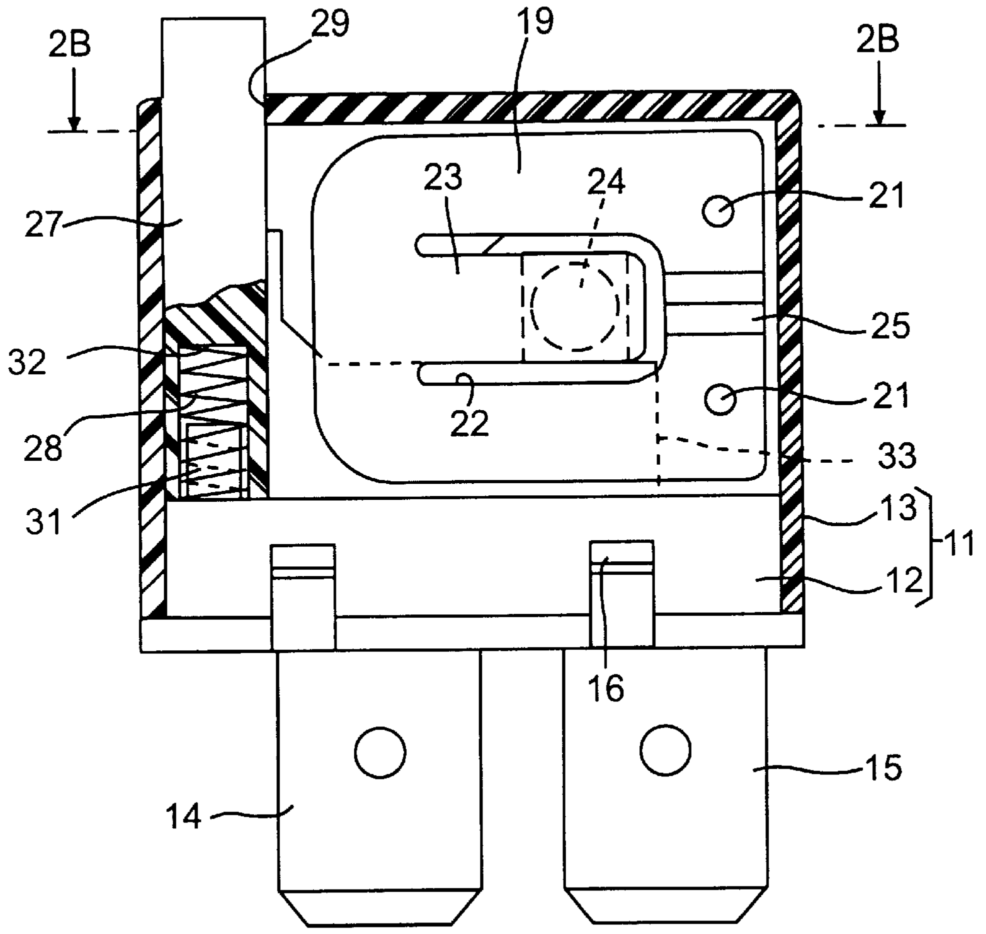
FIG. 2A (PRIOR ART)
FIG. 2A is a longitudinal sectional view showing the circuit protector of FIG. 1 in its initial state.
Figure 2B:
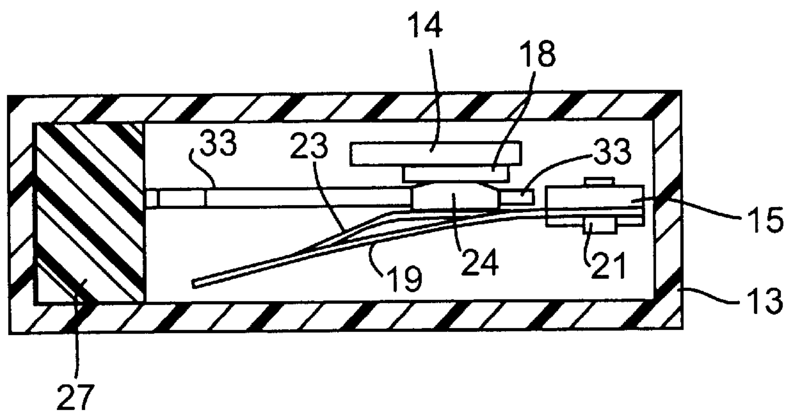
FIG. 2B (PRIOR ART)
FIG. 2B is a sectional view taken along the line 2B—2B in FIG. 2A.
Figure 3A:
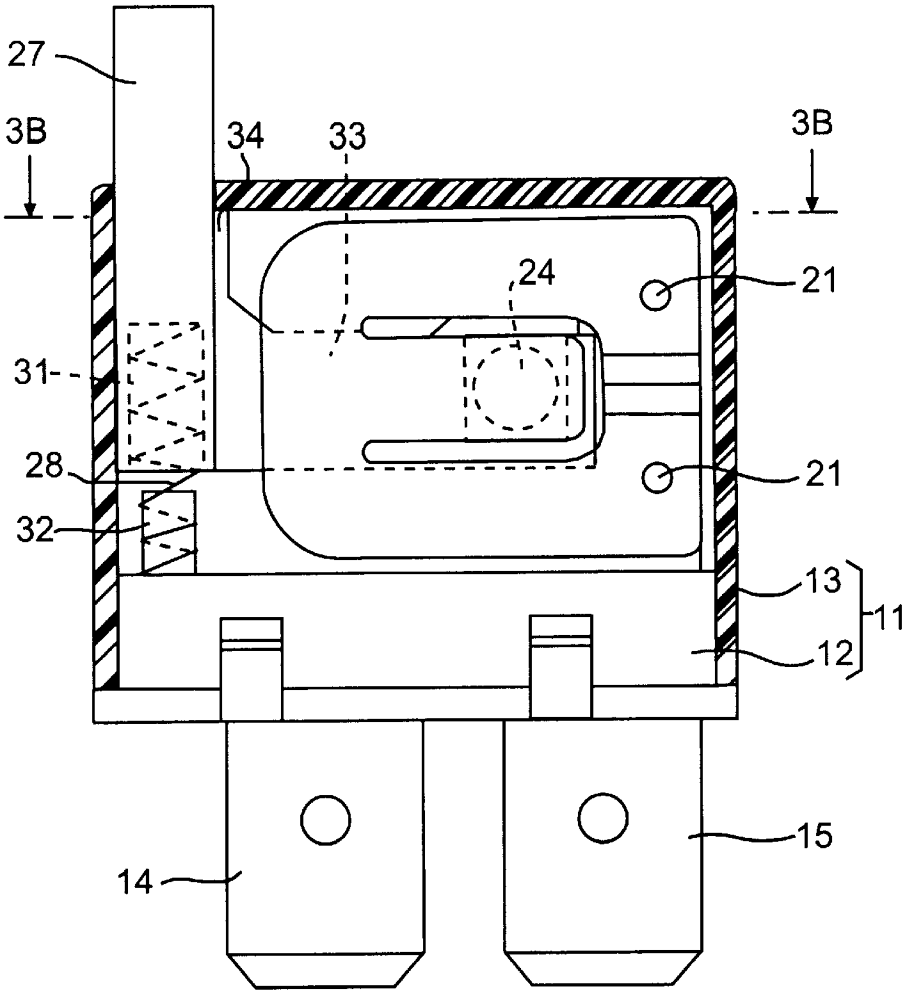
FIG. 3A (PRIOR ART)
FIG. 3A is a longitudinal sectional view showing the circuit protector of FIG. 1 in its cut-off state.
Figure 3B:
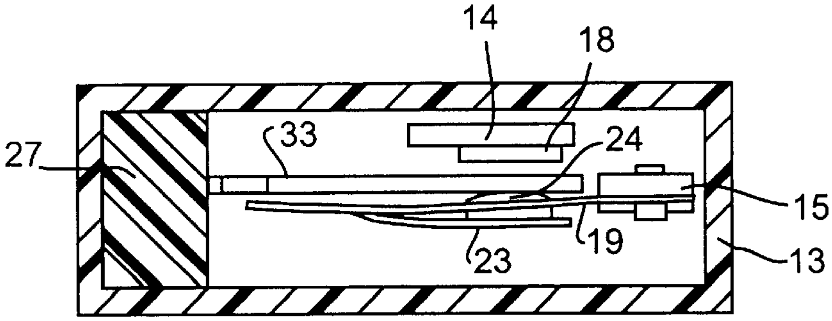
FIG. 3B (PRIOR ART)
FIG. 3B is a sectional view taken along the line 3B—3B in FIG. 3A.
Figure 4A:
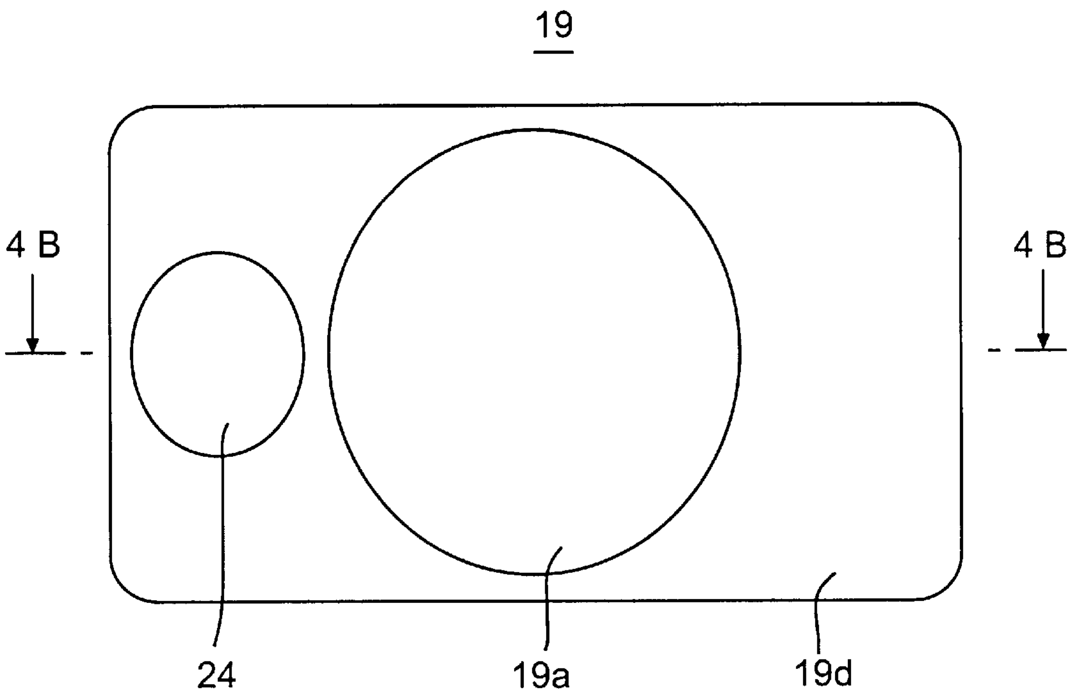
FIG. 4A (PRIOR ART)
FIG. 4A is a plan view depicting another conventional heat-sensitive plate.
Figure 4B:
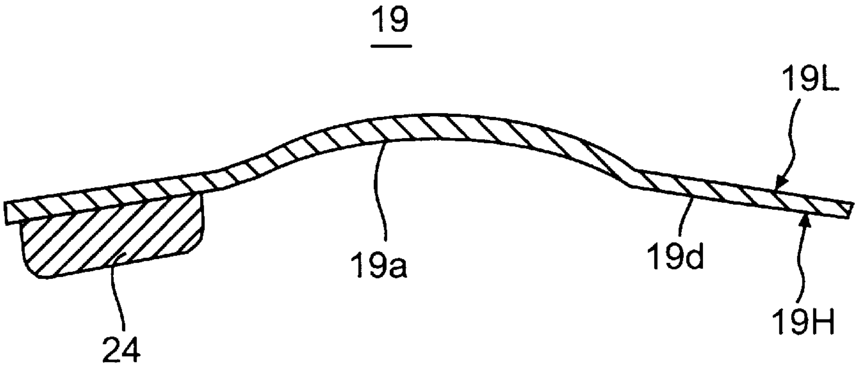
FIG. 4B (PRIOR ART)
FIG. 4B is a sectional view taken along the line 4B—4B in FIG. 4A.

As referred to previously, the conventional heat-sensitive plate depicted in FIGS. 4A and 4B has the defect that the curvature-reversal action characteristic varies with press working, that is, that the temperature for reversal and the amount of displacement of the curvature vary with press work. As the reason for this, it is considered that the region of the bimetallic plate subjected to stamping has changed its temperature characteristic as the bimetallic element, and that the change in the temperature characteristic is likely to vary with stamping. With a view to minimizing the variations in its performance characteristics, the heat-sensitive plate according to the present invention cuts to a minimum the area of that region of the bimetal plate which is subjected to stamping. That is, the heat-sensitive plate according to the present invention has: the curve protrusion 19*a* which is sufficiently smaller in diameter than the shorter side of the bimetal sheet 19 but large in curvature, the protrusion 19*a* being formed by press work of the bimetal sheet 19 substantially centrally thereof;

and an annular press-thinned portion 19*b* which is concentric with the protrusion 19*a* and has an inside diameter sufficiently larger it and an outside diameter larger than the inside one and slightly smaller than the shorter side of the bimetal sheet 19, the annular press-thinned portion 19*b* being also formed by press work. The heat-sensitive plate 19 of such a construction has excellent performance characteristics as described below.

Figure 7C:
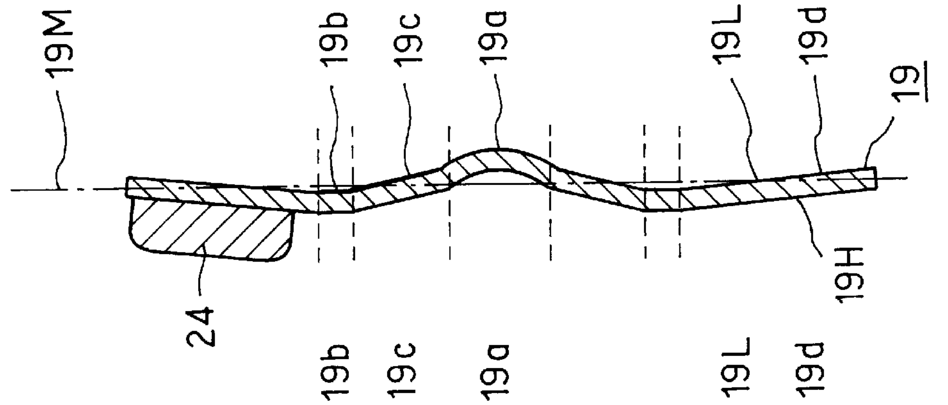
FIG. 7C is a sectional view taken along the line 7B—7B when the reversal of curvature occurs.
Figure 7B:
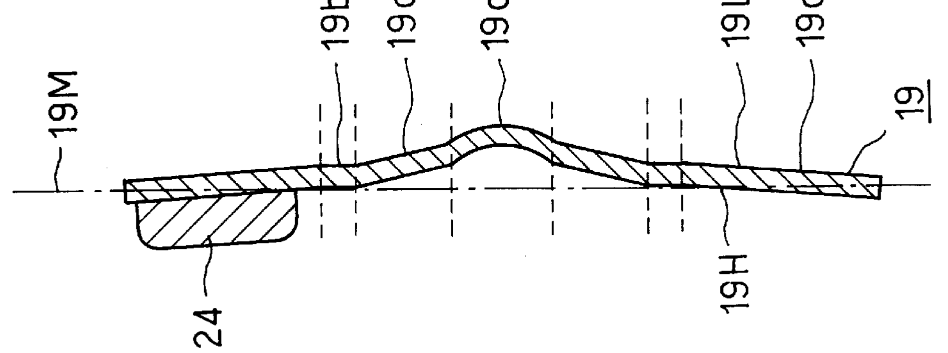
FIG. 7B is a sectional view taken along the line 7B—7B in FIG. 7A when no reversal of curvature occurs.
Figure 7A:
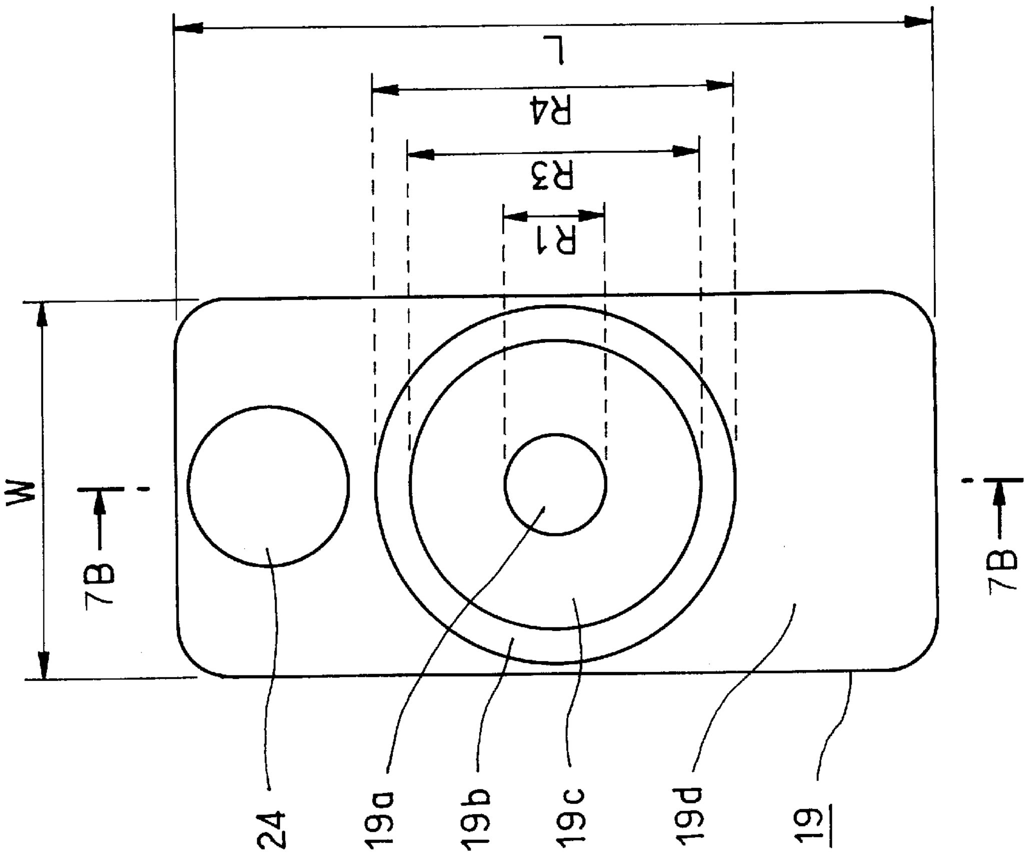
FIG. 7A is a front view of a heat-sensitive plate 19 in FIG. 5A.

FIG. 7A is a plan view of the heat-sensitive plate 19 according to the present invention and FIG. 7B its sectional view taken on the line 7B—7B in FIG. 7A when the heat-sensitive plate 19 is not in its curvature-reversed state (that is, when its temperature is below a predetermined value). The one side 19H of the bimetal sheet forming the heat-sensitive plate 19 has a high coefficient of thermal expansion and the other side 19L a lower coefficient of thermal expansion. The rectangular bimetal sheet, which has shorter and longer sides W and L (where W<<L), respectively, is subjected to press working to form at the center thereof the spherical protrusion 19*a* which protrudes on the low expansion coefficient side 19L and has a diameter R1 sufficiently smaller than the shorter side length W. By this press work, the bimetal sheet is, in its entirety, curved into a shallow funnel shape that protrudes in the direction of the protrusion 19*a* at room temperature. The annular press-thinned portion 19*b* is also formed by press working, which portion 19*b* is thinner than but concentric with the protrusion 19*a* and has an inner diameter R3 sufficiently larger than its diameter R1 and an outer diameter R4 a little larger than the inner one R3. The diameter R4 of stamping means is slightly smaller than the width W of the bimetallic element.

By this press working, there is defined between the protrusion 19*a* and the annular press-thinned portion 19*b* a funnel-like curved portion 19*c* which has not been subjected directly to press working. When the temperature of the heat-sensitive plate 19 is above a predetermined value but below room temperature, the heat-sensitive plate 19 is stable in its entirety with the annular press-thinned portion 19*b* positioned further to the protrusion 19*a* side than a straight line 19M joining the centers of the both shorter sides of the heat-sensitive plate 19 as depicted in FIG. 7B. Thus, the central portion of the heat-sensitive plate 19 is press-thinned and the plate surface is slightly curved and protrudes over the entire area thereof in the same direction as the protrusion 19*a*, producing curvature-deformation stress as in the case where the surrounding region 19*d* is contracted relative to the central area of the plate 19.

The heat-sensitive plate 19 carries the movable contact 24 mounted on the high expansion coefficient side 19H adjacent its one shorter side centrally thereof. Pressing the protrusion 19*a* in the direction opposite to that of its protrusion at room temperature, stress inward from the surrounding region 19*d* becomes maximum the instant when the annular press-thinned portion 19 *b* goes across the line 19M. As a result, the surrounding region 19*d* pops up as shown in FIG. 7C, but resilient bending stress near the annular press-thinned portion 19*b* increases. Accordingly, when releasing the pressure on the protrusion 19*a*, the surrounding region 19*d* snaps back into its initial state of curvature due to the bending stress. However, when the temperature of the heat-sensitive plate 19 rises above a predetermined value under the condition of FIG. 7B, the force of expansion that tends to swell the high expansion coefficient side throughout the bimetallic element overcomes the internal stress of the surrounding region 19*d*, and consequently, the annular press-thinned portion 19*b* goes across the straight line 19M and snaps into such a state as shown in FIG. 7C. FIG. 7C is a cross-sectional view of the heat-sensitive plate 19 along the line 7C—7C in FIG. 7A after the reversal of curvature, showing that the shape of the heat-sensitive late 19 inside the annular rolled region 19*b* remains unchanged but hat the surrounding region 19*d* outside the annular press-thinned region 19*b* has revered the direction of its curvature.

As a result, the insulating piece 33 disengages from the movable contact 24, and is pushed up by the spring force of the coil spring 28 and into between the fixed contact 18 and the movable contact 24. If the temperature of the heat-sensitive plate 19 is held unchanged, the surrounding region 19*d* remains in its reversed state. If the temperature goes down below the predetermined value, the surrounding region 19*d* snaps back into its initial state of curvature. Thus, the annular press-thinned portion 19*b*, formed by press working, functions as a resilient hinge about which the curved portion 19*c* and the surrounding region 19*d* coupled together therethrough are resiliently bent relative to each other.

Even if the heat-sensitive plate 19 cools and reverses its direction of curvature, the insulating piece 33 still lies between the movable contact 24 and the fixed contact 18, keeping them out of contact with each other. Depressing the reset rod 27 when the heat-sensitive plate 19 has become cooled, the insulating piece 33 moves out from between the contacts 18 and 24 and down to its initial position, allowing them to contact each other. Releasing the reset rod 27 in this state, the insulating piece 33 is urged upward by the spring force of the coil spring 28 to bring its upper edge into abutting relation to the lower edge of the movable contact 24, and is held at this position.

Figure 8B:
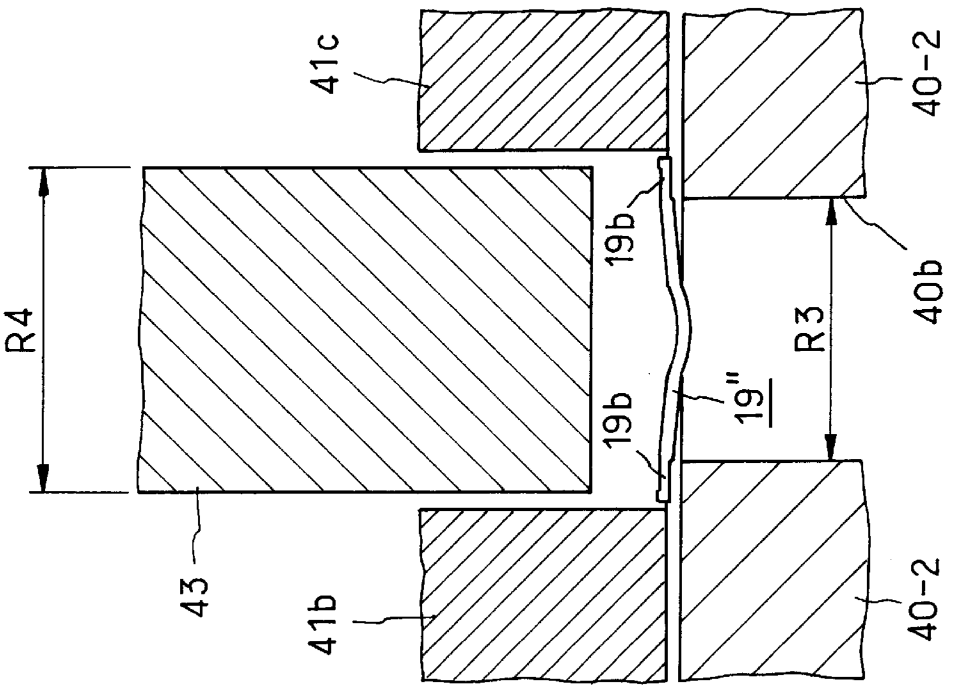
FIG. 8B is a schematic diagram for explaining how to form a rolled portion 19*b* of the heat-sensitive plate 19.
Figure 8A:
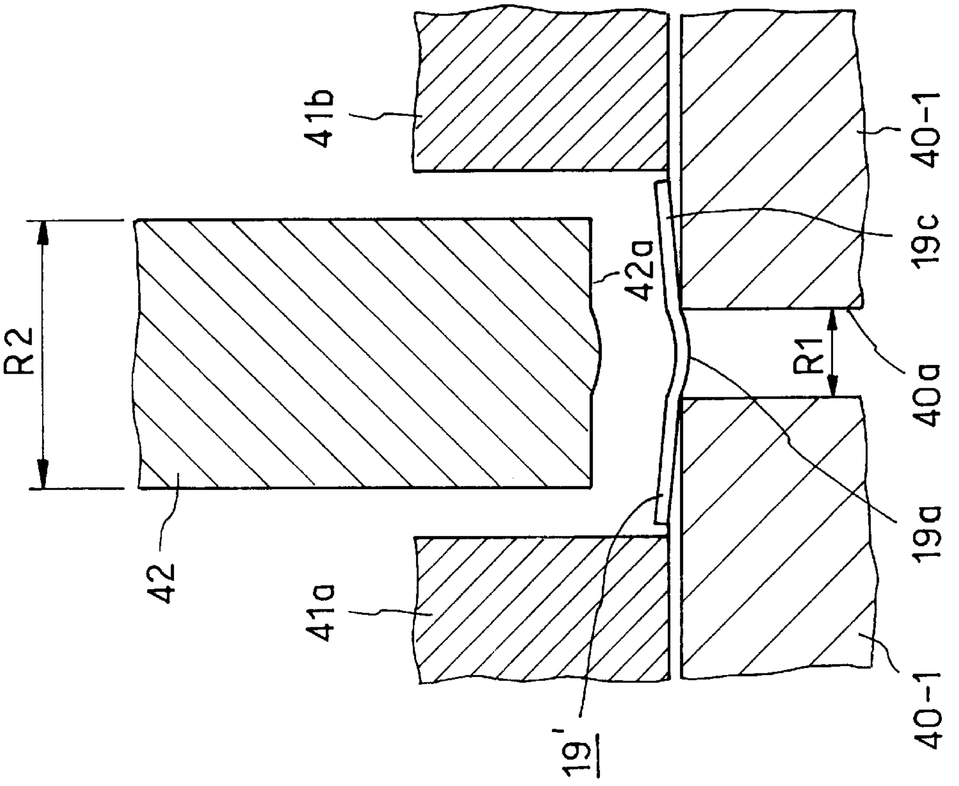
FIG. 8A is a schematic diagram for explaining the formation of a protrusion 19*a* of the heat-sensitive plate 19 depicted in FIG. 5A.
Figure 9:
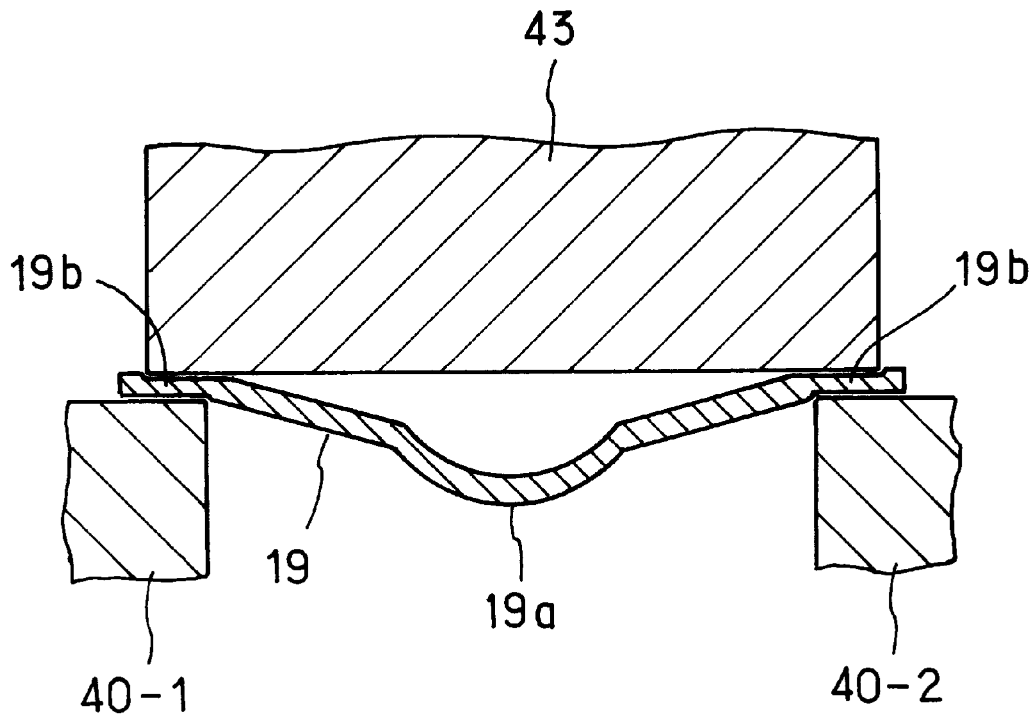
FIG. 9 is a diagram depicting the cross-section of the heat-sensitive plate 19 when it is subjected to pre work in the step of FIG. 8B.

Next, a description will be given, with reference to FIGS. 8A, 8B and 9, of a method for making the resilient heat-sensitive plate 19.

Step 1: A thin sheet of bimetallic material is punched into a rectangular form measuring L×W (where L>W).

Step 2: The rectangular sheet with the low expansion coefficient side down is placed on a first die 40-1 which has a first hole 40*a* of an inner diameter R1 sufficiently smaller than the width W, with the center of the rectangular sheet of bimetal aligned with the center of the hole 40*a*.

Step 3: A first punch 42, which is a columnar member of an outer diameter R2 somewhat smaller the width W but sufficiently larger than the diameter R1 and which has the bottom of the columnar member a spherical protrusion 42*a* of a diameter nearly equal to the inner diameter R1 of the first die 40-1, is disposed with the spherical protrusion 42*a* held in alignment with the hole 40*a* of the first dice 40-1. Then the rectangular thin sheet of bimetal 19 is subjected to press working (also called drawing) by the combined use of the first punch 42 and the first die 40-1 to form the protrusion 19*a* at the center of the thin sheet of bimetal 19. Since the protrusion 19*a* formed by this press working applies stress to its surrounding portion, the funnel-like curved portion 19*c* is formed all around it (FIG. 8A).

Step 4: the thin sheet of bimetal 19 is placed on a second die 40-2 which has a second hole 40*b* of an inner diameter R3 nearly equal to the outer diameter R2 of the first punch 42, with the center of the protrusion 19a of the tin sheet 19 aligned with the center of the second hole 40*b*.

Step 5: A columnar, flat-bottomed second punch 43, which has an outer diameter R4 slightly smaller than the width W and larger than the outer diameter R2 of the first punch and the diameter R3 of the second die 40-2 , is disposed concentrically with the second hole 40*b* of the second die 40-2. Then, the thin sheet of bimetal 19 is press-worked by the second punch 43 and the second die 40-2 to form the donut-like annular press-thinned portion 19*b* all around the funnel-like curved portion 19*c* (FIGS. 8B and 9).

By changing the stroke of press working (that is, the degree of pressing of the annular press-thinned portion 19*b*), it is possible to obtain heat-sensitive plates of different temperature-dependent conditions for reversal.

Shown below are examples of concrete dimensions of the heat-sensitive plate of excellent performance characteristics, produced by the above method in the case of using a 0.1 mm thick bimetal sheet.

L=7.5 mm; W=3.8 mm; R1=1.0 mm; R3=2.9 mm; R4=3.6 mm. According to the present invention, such a miniature heat-sensitive plate can be manufactured. Heat-sensitive plates of different dimensions were produced using various sizes for the diameters R1, R3 and R4, and their temperature characteristics were tested. Even if the sizes R1, R3 and R4 were within ±10% tolerance, variations in operation were within a permissible range. The following dimensional conditions are defined for the reversal action of the heat-sensitive plate according to the present invention. The longer side L is in the range of 1.5 to 3 times larger than the shorter side W, and the shorter side W, the diameter R1 of the protrusion 19*a* and the inner and outer diameters R3 and R4 of the annular press-thinned portion 19*b* bear a relation W>R4>R3>>R1. However, it is preferable that the shorter and longer sides bear a ratio of 1:2 and that the diameter of the protrusion 19*a* and the inner and outer diameters R3 and R4 of the annular press-thinned portion 19*b* be about 1:3:4.

EFFECT OF THE INVENTION

As described above, the resilient heat-sensitive plate for use in the present invention can be miniaturized because of its simple structure that the central portion of a rectangular bimetal sheet is deformed by press working. The use of such a heat-sensitive plate 19 permits reduction of the size of the entire circuit protector structure. In addition, since the longer side of the heat-sensitive plate 19 is disposed in the same direction as in the lengthwise direction (the direction of height) of the reset rod 27, the width of the circuit protector (in the direction of the longer side of the base 12) can sharply be reduced as a whole.

The resilient heat-sensitive plate according to the present invention is simple-structured, and hence it reduces the number of steps involved in its manufacture and cuts the manufacturing cost.

What is claimed is:

1. A resilient heat-sensitive plate formed by a rectangular bimetal sheet the one and the other side of which form a high expansion coefficient side and a low expansion coefficient side, respectively, said plate comprising:

a protrusion formed by press working substantially at the center of said bimetal sheet, protruding outward from said low expansion coefficient side and having a diameter smaller than the shorter side of said rectangular bimetal sheet, said bimetal sheet being curved, by the formation of said protrusion, into a shallow funnel shape in the same direction as said protrusion all over the surrounding area;

an annular press-thinned portion formed concentrically with said protrusion and having an inner diameter larger than the diameter of said protrusion and an outer diameter smaller than said shorter side of said rectangular bimetal sheet; and a movable contact mounted on said high expansion coefficient side outside said annular press-thinned portion but adjacent to said shorter side.

2. The heat-sensitive plate of claim 1, wherein the longer side of said rectangular bimetal sheet is 1.5 to 3 times longer than said shorter side.

3. The heat-sensitive plate of claim 2, wherein the longer side of said rectangular bimetal sheet is about twice longer than said shorter side.

4. The heat-sensitive plate of claim 1, 2, or 3, wherein the diameter of said protrusion is less than one half of said shorter side of said rectangular bimetal sheet.

5. The heat-sensitive plate of claim 1, 2, or 3, wherein the ratio between the diameter of said protrusion and the inner and outer diameters of said annular press-thinned portion is approximately 1:3:4.

6. A circuit protector for cutting off a current flow between terminals in response to a temperature rise, said protector comprising:

a base formed by a block-shaped insulator having substantially rectangular top and bottom faces;

first and second opposed terminal plates made of metal and planted on said base in such a manner as to vertically extend through its top and bottom faces, the upper portion of said first terminal plate projecting upwardly of the top face of said base being substantially rectangular and said first terminal plate being placed with the longer side of the projecting portion held normal to the top face of said base;

a fixed contact mounted on that side of said first terminal plate facing said second terminal plate and located adjacent the upper edge of said first terminal plate, said second terminal plate being placed with its upper edge held lower than the lower end of said fixed contact;

a substantially rectangular heat-sensitive plate which has a funnel-shaped curved surface held approximately directly opposite said first terminal plate but spaced apart therefrom, has a movable contact mounted on said funnel-like curved surface for making resilient contact with said fixed contact and has its lower end potion fixedly secured to said second terminal plate, said heat-sensitive plate urging said movable contact against said fixed contact when the temperature of said heat-sensitive plate is below a predetermined value but, when said plate temperature is above said predetermined value, disengaging said movable contact from said fixed contact by the reversal of the direction of curvature of said funnel-like curved surface;

spring engaging means placed on the top face of said base in adjacent but spaced relation to said opposed first and second terminal plate at one marginal edge thereof;

a coil spring having its lower end engaged with said spring engaging means and placed in a manner to resiliently extend and contract in a direction approximately normal to the top face of said base;

a reset rod having engaged at its lower end face with the upper end of said coil spring and placed perpendicularly to the top face of said base;

an insulating piece extending from one side of said reset rod into between said first terminal plate and said heat-sensitive plate and having a face substantially parallel to said first terminal plate; and a case composed of side and top panels to define space on top of said base and having housed therein said first and second terminal plates, said heat-sensitive plate, said coil spring, said reset rod and said insulating piece, the upper end portion of said reset rod being allowed to project out through a guide hole made in said upper panel;

wherein:

said heat-sensitive plate comprises:

a bimetal sheet the one and the other side of which form a high expansion coefficient side and a low expansion coefficient side, respectively, said movable contact mounted on said high expansion coefficient side in close proximity of the upper end of said bimetal sheet;

a protrusion formed by press working substantially at the center of said bimetal sheet, protruding outward from said low expansion coefficient side and having a diameter smaller than the shorter side of said rectangular bimetal sheet, said bimetal sheet being curved, by the formation of said protrusion, into a shallow funnel shape in the same direction as said protrusion all over the surrounding area; and an annular press-thinned portion formed by press working concentrically with said protrusion and having an inner diameter larger than the diameter of said protrusion and an outer diameter smaller than the shorter side of said bimetal sheet; and wherein: in an initial state in which the temperature of said heat-sensitive plate is lower than said predetermined value, the upper edge of said insulating piece is caused by said coil spring to resiliently abut against the lower edge of said movable contact; and when the temperature of said heat-sensitive plate becomes higher than said predetermined value, said insulating piece enters into between said fixed contact point and said movable contact disengaged by the reversal of the direction of said funnel-like curved surface of said heat-sensitive plate.

7. The circuit protector of claim 6, wherein said reset rod is square-shaped and said guide hole is a square hole.

8. The circuit protector of claim 6 or 7, wherein said sensitive-plate is fixedly welded to said second terminal plate.

9. The circuit protector of claim 6, wherein said first and second terminal plates disposed with their surface held in parallel to the longer side of the top face of said base and with one of their marginal edges held adjacent one shorter side of said base, and said spring engaging means is disposed between the other marginal edges of said first and second terminal plates and the other shorter side of said base.

10. The circuit protector of claim 6, wherein said reset rod has made in its lower end face for receiving the upper end portion of said coil spring.

11. The circuit protector of claim 6, wherein the longer side of said rectangular bimetal sheet is 1.5 to 3 times longer than the shorter side thereof.

12. The circuit protector of claim 6, wherein the longer side of said rectangular bimetal sheet is about twice longer than the shorter side thereof.

13. The circuit protector of claim 6, 11, or 12, wherein the diameter of said protrusion is less than one half of the shorter side of said rectangular bimetal sheet.

14. The circuit protector of claim 6, 11, or 12, wherein the ratio between the diameter of said protrusion and the inner and outer diameters of said annular press-thinned portion is approximately 1:3:4.

15. A method of making a resilient heat-sensitive plate formed by a rectangular bimetal sheet the one and the other side of which form a high expansion coefficient side and a low expansion coefficient side, respectively, said method comprising the steps of:

(a) punching a bimetal sheet by press working into a rectangular sheet measuring L×W, where said L is larger than said W;

(b) mounting said rectangular bimetal sheet with said low expansion coefficient side down on a first die having a first hole of an inner diameter R1 smaller than said W, with the center of said low expansion coefficient side of said bimetal sheet held in alignment with the center of said hole;

(c) placing above said bimetal sheet a first punch with its spherical protrusion held in alignment with said hole of said first die, and punching said bimetal sheet by said first punch and said first die to stamp it to form a protrusion at the center of said bimetal sheet and a funnel-like curved portion around it, said first punch being a columnar member which has an outer diameter R2 somewhat smaller than said W but sufficiently larger than said diameter R1 and which has on its underside said spherical protrusion of a diameter nearly equal to said diameter R1;

(d) mounting said bimetal sheet on a second die which has a second hole of an inner diameter R3 nearly equal to said diameter R2, with the center of said protrusion of said bimetal sheet aligned with the center of said second hole; and (e) placing a columnar, flat-bottomed second punch above said bimetal sheet in alignment with said second hole of said second die, and press-working said bimetal sheet by said second punch and said second die to form a donut-like annular press-thinned portion, said second punch having an outer diameter R4 smaller than said W and larger than said diameters R2 and R3.

* * * * *